United States Patent
Kubota et al.

(10) Patent No.: US 10,759,228 B2
(45) Date of Patent: Sep. 1, 2020

(54) FUEL EFFICIENT PNEUMATIC TIRE

(71) Applicant: The Yokohama Rubber Co., Ltd., Minato-ku, Tokyo (JP)

(72) Inventors: Masataka Kubota, Hiratsuka (JP); Yuji Minami, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 494 days.

(21) Appl. No.: 14/392,242

(22) PCT Filed: Jun. 24, 2014

(86) PCT No.: PCT/JP2014/066705
§ 371 (c)(1),
(2) Date: Dec. 24, 2015

(87) PCT Pub. No.: WO2014/208553
PCT Pub. Date: Dec. 31, 2014

(65) Prior Publication Data
US 2016/0176233 A1     Jun. 23, 2016

(30) Foreign Application Priority Data

Jun. 24, 2013   (JP) .................... 2013-131825

(51) Int. Cl.
*B60C 3/04* (2006.01)
*B60C 11/03* (2006.01)
*B60C 11/04* (2006.01)

(52) U.S. Cl.
CPC ............... *B60C 3/04* (2013.01); *B60C 11/03* (2013.01); *B60C 11/033* (2013.01);
(Continued)

(58) Field of Classification Search
CPC .............. B60C 11/033; B60C 11/13; B60C 2011/0355; B60C 2011/0367; B60C 3/04;
(Continued)

(56) References Cited

U.S. PATENT DOCUMENTS 3,897,813 A * 8/1975 Verdier .................. B29D 30/54
152/209.18
4,281,702 A * 8/1981 Grosch .................... B60C 11/01
152/209.18
(Continued)

FOREIGN PATENT DOCUMENTS

EP    2 781 372      9/2014
JP    2008-201368    9/2008
(Continued)

OTHER PUBLICATIONS

Inoue (JP 2012-162194, Aug. 30, 2012, machine translation).*
(Continued)

*Primary Examiner* — Robert C Dye
*Assistant Examiner* — Sedef E Paquette
(74) *Attorney, Agent, or Firm* — Thorpe North & Western

(57) ABSTRACT

To provide a pneumatic tire with improved performance and balance in terms of fuel efficiency, steering stability performance and wear life. The total width SW, outside diameter OD, tread groove depth Ga, center groove depth Gc and shoulder groove depth Gs satisfy the relationships $SW/OD \leq 0.3$, $Ga \leq 0.02 \times SW + 2.5$ and $Gc > Gs$.

5 Claims, 3 Drawing Sheets

(52) U.S. Cl.
CPC .......... *B60C 11/0332* (2013.01); *B60C 11/04* (2013.01); *B60C 2011/0334* (2013.01); *B60C 2011/0339* (2013.01); *B60C 2011/0341* (2013.01); *B60C 2011/0348* (2013.01); *B60C 2011/0353* (2013.01); *B60C 2011/0355* (2013.01); *B60C 2011/0358* (2013.01); *B60C 2011/0383* (2013.01)

(58) Field of Classification Search
CPC ............. B60C 11/03; B60C 2011/0339; B60C 2011/0341; B60C 2011/0348; B60C 2011/0353; B60C 2011/0358
USPC ..................................................... 152/209.25
See application file for complete search history.

(56) References Cited

U.S. PATENT DOCUMENTS

| | | | | |
|---|---|---|---|---|
| 9,511,630 | B2* | 12/2016 | Hatanaka | .................. B60C 3/04 |
| 2008/0202658 | A1 | 8/2008 | Ikeda et al. | |
| 2013/0042953 | A1 | 2/2013 | Kuwayama | |
| 2013/0061992 | A1* | 3/2013 | Mathonet | ................ B60C 11/04 |
| | | | | 152/209.18 |
| 2014/0083584 | A1* | 3/2014 | Schiller | ............... B60C 11/0083 |
| | | | | 152/209.14 |
| 2014/0138003 | A1* | 5/2014 | Kuwayama | ............... B60C 3/04 |
| | | | | 152/454 |
| 2014/0290820 | A1 | 10/2014 | Hatanaka et al. | |

FOREIGN PATENT DOCUMENTS

| | | | | |
|---|---|---|---|---|
| JP | | 2012-091733 | 5/2012 | |
| JP | | 2012-091736 | 5/2012 | |
| JP | | 2012-162194 | 8/2012 | |
| WO | | WO 2011/135774 | 11/2011 | |
| WO | | WO 2012159809 A1 * | 11/2012 | ......... B60C 11/0083 |
| WO | | WO 2012176476 A1 * | 12/2012 | ............... B60C 3/04 |
| WO | | WO 2013/065319 | 5/2013 | |
| WO | | WO 2013065319 A1 * | 5/2013 | |

OTHER PUBLICATIONS

Kubota (JP 2012-091733, May 17, 2012, machine translation).*
Wheels (Want to figure out diameter to compare tires? Here's the formula, Mar. 2008, pp. 1-3) (Year: 2008).*
Math is fun (Rounding Numbers, 2012, p. 1) (Year: 2012).*

* cited by examiner

FUEL EFFICIENT PNEUMATIC TIRE

TECHNICAL FIELD

The present technology relates to a pneumatic tire that improves fuel efficiency and the like.

BACKGROUND

To-date, pneumatic tires for low fuel consumption by vehicles have been proposed (see International Patent Publication No. WO/2011/135774, for example).

The technology disclosed in International Patent Publication No. WO/2011/135774 involves reducing a frontal projected area of a tire (the projected area when a pneumatic tire is viewed from its rolling direction) with a tire cross-sectional width W and outside diameter L ratio W/L of 0.25 or less, in order to reduce rolling resistance and improve vehicle fuel efficiency.

SUMMARY

In recent years, when there has been a demand for pneumatic tires that can simultaneously demonstrate high levels of performance in terms of steering stability performance and wear life, as well as fuel efficiency, it has been unknown whether well-balanced performance in terms of all aspects can be demonstrated by adjusting the W/L ratio alone.

The present technology provides a pneumatic tire with improved performance and balance in terms of fuel efficiency, steering stability performance and wear life.

The pneumatic tire according to the present technology is a pneumatic tire wherein grooves are provided on a tread portion. The total width SW and outside diameter OD satisfy the relationship SW/OD≤0.3. The maximum groove depth of a groove provided in a center region AC having a width 50% of the ground contact width W with the tire equator line as its center is the center groove depth Gc, the maximum groove depth of a groove provided in the shoulder region AS outside from the center region AC in the direction of the tire width is the shoulder groove depth Gs, and furthermore, the mean value of the center groove depth Gc and shoulder groove depth Gs is the tread groove depth Ga. In which case, the tread groove depth Ga and total width SW satisfy the relationship Ga≤0.02×SW+2.5. In addition the center groove depth Gc and shoulder groove depth Gs satisfy the relationship Gc>Gs.

In a pneumatic tire according to the present technology, limits are applied to the relationship of the total width SW and outside diameter OD, the relationship of the tread groove depth Ga and Total width SW, and the relationship of the center groove depth Gc and shoulder groove depth Gs. As a result, according to the present technology, performance and balance are improved in terms of fuel efficiency, steering stability and wear life.

BRIEF DESCRIPTION OF THE DRAWINGS

FIG. 3A is an example of a groove G1 included only in either the center region AC or shoulder region AS (this drawing also serves as an example of inclusion only in the center region AC), FIG. 3B is an example of a groove G2 included in both the center region AC and shoulder region AS crossing once over the boundary line BL of the center region AC and shoulder region AS, FIG. 3C is an example of a groove G3 included in both the center region AC and shoulder region AS crossing over the boundary line BL multiple times, and FIG. 3D is an example of a groove G4 extending on the boundary line BL.

DETAILED DESCRIPTION

The following is a detailed description of an embodiment of a pneumatic tire according to the present technology (hereinafter, referred to as the basic embodiment and additional embodiments 1 to 4), based on the drawings. Note that the present technology is not limited to these embodiments. Furthermore, the constituents of the embodiments include constituents that can be easily replaced by those skilled in the art, and constituents that are substantially the same. In addition, the various modes included in this embodiment can be combined as desired within the scope of obviousness by a person skilled in the art.

BASIC EMBODIMENT

A basic embodiment of the pneumatic tire according to the present technology will now be described. In the following description, "tire radial direction" refers to a direction orthogonal to the rotational axis of the pneumatic tire; "inside in the tire radial direction" refers to a side that is toward the rotational axis in the tire radial direction; and "outside in the tire radial direction" refers to a side that is away from the rotational axis in the tire radial direction. Furthermore, "tire circumferential direction" refers to a circumferential direction with the rotational axis as the center axis. Additionally, "widthwise direction of the tire" refers to a direction parallel to the axis of rotation; "inside in the widthwise direction of the tire" refers to a side that is toward a "tire equatorial plane CL" (tire equator line) in the widthwise direction of the tire; and "outside in the widthwise direction of the tire" refers to a side that is away from the tire equatorial plane CL (tire equator line) in the widthwise direction of the tire. Note that tire equatorial plane CL (tire equator line) refers to a plane that is orthogonal to the rotational axis of the pneumatic tire and a plane (line) that passes through the center of the tire width of the pneumatic tire.

In addition, the provisions referenced in the present embodiment (rim size, prescribed air pressure, applied load) are governed by the stipulations of international standards (ISO) enacted by the International Organization for Standardization. However, any rules not stipulated by ISO are governed by Japanese Industrial Standards (JIS). In addition, even if stipulated by ISO, if the scope of JIS exceeds that of ISO stipulations, then the stipulation complies with either one of ISO or JIS stipulations.

Figure 1:
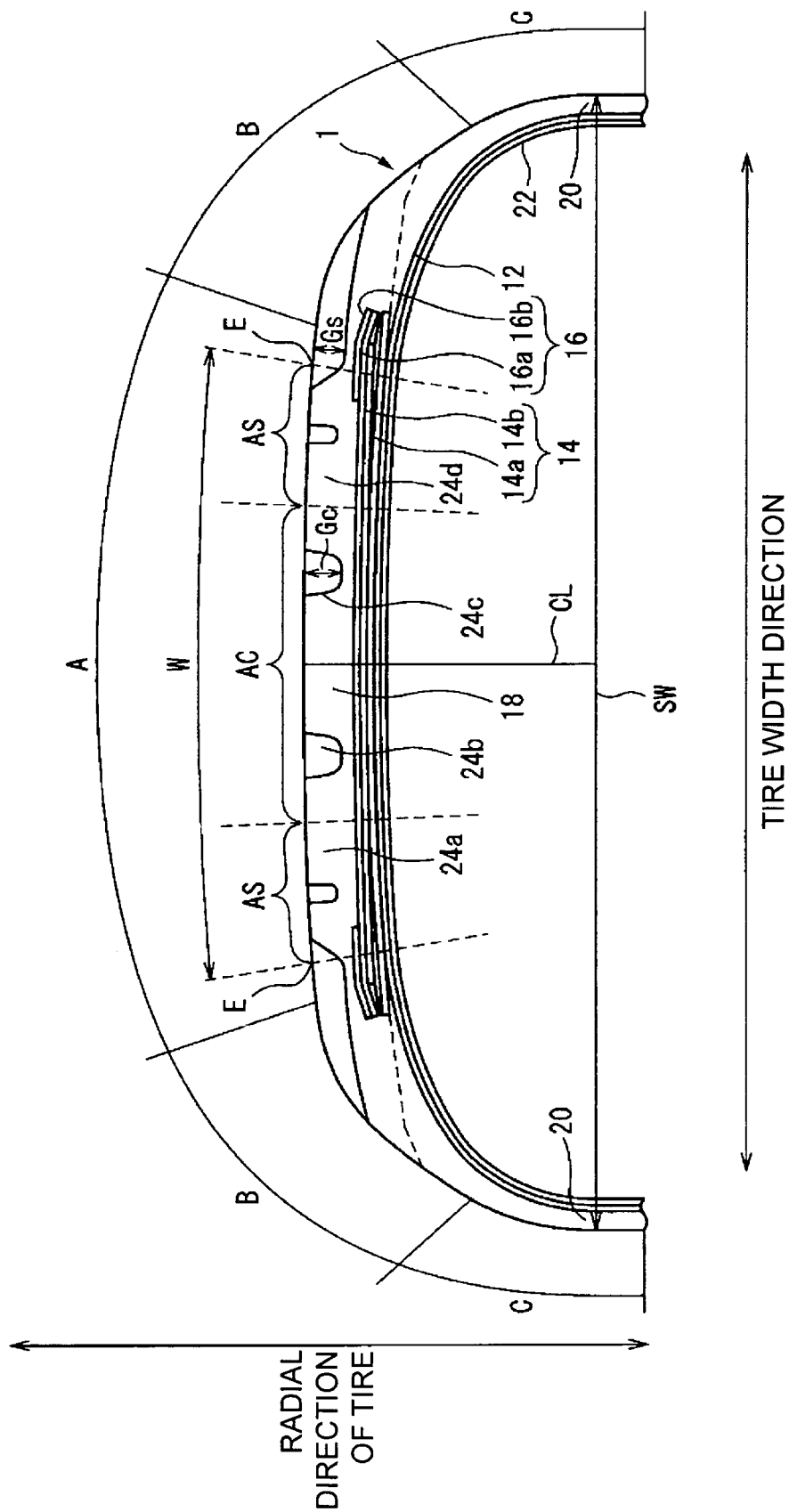
FIG. 1 is a tire meridian cross-sectional view illustrating the region from the tread portion to the side wall portion according to an embodiment of the present technology.

FIG. 1 is a tire meridian cross-sectional view illustrating the region from the tread portion to the side wall portion according to an embodiment of the present technology. That is, the region of a pneumatic tire illustrated in this drawing is a region including a tread portion A, pair of shoulder portions B, B extending outside in the widthwise direction of the tire and inside in the tire radial direction of the tread portion A, and a pair of side wall portions C, C (However, FIG. 1 illustrates only the outside in the tire radial direction portion) each extending inside in the tire radial direction of both shoulder portions B, B. The region illustrated in FIG. 1 then stretches out to a pair of respective bead portions extending from the side wall portions C, C, and furthermore inside in the tire radial direction (not illustrated in drawing).

In a pneumatic tire according to the present embodiment, a pair of shoulder portions, side wall portions and bead portions are each continuously formed with the tread portion as their center in a tire meridian cross sectional view with the above configuration. Furthermore, the area from the tread portion to each of the bead portions extends continuously in the tire circumferential direction, and the tire assumes an overall toroidal form.

In the region from the tread portion A to the side wall portions C via the shoulder portions B illustrated in FIG. 1, a carcass layer 12, belt layer 14, belt cover layer 16, treat rubber 18, a pair of side wall rubbers 20, 20 and an inner liner 22 are arranged.

The carcass layer 12 is a member extending between bead cores not illustrated in the drawing on both sides in the widthwise direction of the tire via portions C, B and A as illustrated, and forms the tire skeleton. Furthermore, although the carcass layer 12 illustrated in FIG. 1 is constituted by a single layer carcass, it is not limited to the present embodiment and the carcass layer 12 may be constituted by multiple carcasses.

The belt layer 14 is a member that is disposed outside in the tire radial direction of the carcass layer 12, strongly tightens the carcass layer 12, and increases the rigidity of the tread portion A. The belt layer 14 is constituted by a plurality of belts, e.g. the two belts 14a, 14b illustrated in FIG. 1, formed in sequence from inside to outside in the tire radial direction. The belts 14a, 14b have a structure in which belt cords are mutually intersecting.

The belt cover layer 16 is a member that is disposed outside in the tire radial direction of the belt layer 14, and restricts lifting of both end portions of the belt layer 14 in the widthwise direction of the tire due to centrifugal force during high-speed travel. The belt cover layer 16 is constituted by a plurality of the belt covers, e.g. two belt covers 16a, 16b illustrated in FIG. 1, formed in sequence from inside to outside in the tire radial direction. Thus, by primarily preventing peeling trouble of the end portions of the belt layer 14, it is possible to improve high-speed endurance.

Tread rubber 18 is a member disposed primarily outside in the tire radial direction on the carcass layer 12 and belt layer 14 in the tread portion A and makes contact with a road surface, and is an outer covering member of the tire that protects the carcass layer 12, and prevents wear and damage.

The side wall rubber 20 is an outer covering member of the tire that is disposed outside of the tread rubber 18 in the widthwise direction of the tire, and is disposed outside the carcass layer 12 in the tire radial direction and in the widthwise direction of the tire in the region from the shoulder portions B to the side wall portions C. The side wall rubber 20 resistant to repeated bending deformation during tire travel, protects the carcass layer 12 from external force, and prevents damage. Furthermore, in FIG. 1, the boundary line of the tread rubber 18 and side wall rubber 20 is indicated by a dotted line.

The inner liner 22 is a member that is disposed on the tire inner circumferential surface, and is a band-shaped rubber sheet member covering the carcass layer 12. It prevents oxidation of the carcass layer 12 from exposure, and prevents the leaking of air in the tire.

Grooves are provided on the surface of the tread portion A (tread surface) illustrated in FIG. 1, in a pneumatic tire 1 providing each of the constituent elements 12, 14, 16, 18, 20, 22 described above. The grooves in the present embodiment include grooves defining various tread patterns formed on the tread surface extending in any direction. That is, the grooves may be grooves extending in the tire circumferential direction (hereinafter, "circumferential grooves"), or grooves diagonal to the tire circumferential direction (includes groove extending in the widthwise direction of the tire, hereinafter "diagonal grooves." In addition, if the grooves are diagonal grooves, they include grooves wherein at least one end thereof communicates with a circumferential groove, as well as grooves that are not communicated with. Furthermore, four such grooves 24a, 24b, 24c and 24d of these grooves are illustrated in FIG. 1.

Furthermore, in the present embodiment, circumferential grooves and diagonal grooves both refer to grooves that are 3 mm or more in width, and 2.5 mm or more in depth.

Under the assumptions above, in the present embodiment, total width SW, outside diameter OD, ground contact width W, center region AC, center groove depth Gc, shoulder region AS, shoulder groove depth Gs and tread groove depth Ga are defined as follows.

Figure 2:
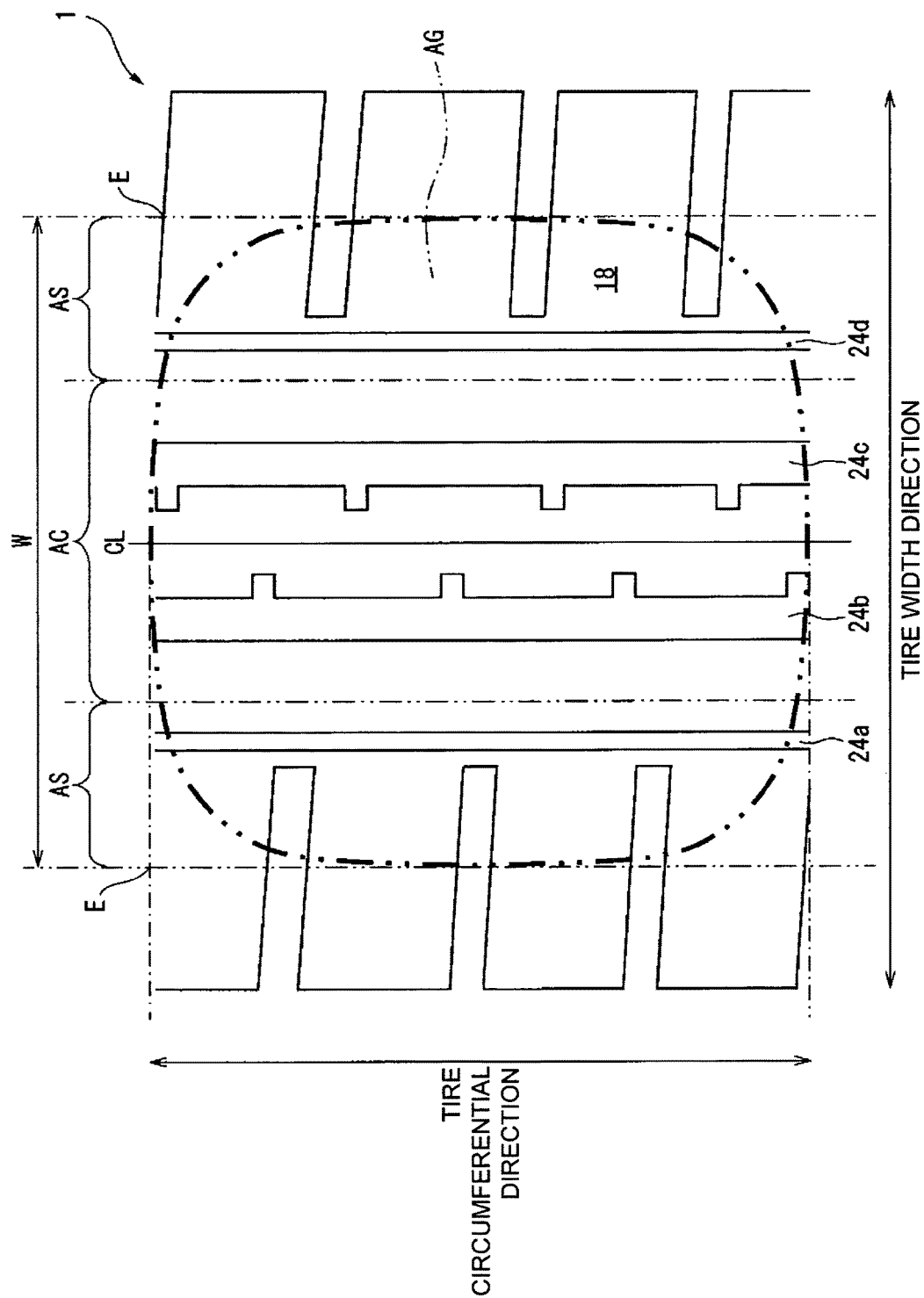
FIG. 2 is a planar schematic view illustrating the ground region AG of the tread surface of the pneumatic tire 1 illustrated in FIG. 1.

That is, the total width SW (see FIG. 1) denotes the overall dimensions of a pneumatic tire 1 in the widthwise direction of the tire when the pneumatic tire 1 is assembled on a rim, the tire is filled to prescribed air pressure and under unloaded conditions. These dimensions includes design sections formed on the outside surface of the side wall portions C. The outside diameter OD (not illustrated in FIG. 1) denotes the overall dimensions of the pneumatic tire 1 illustrated in FIG. 1 in the tire radial direction when the pneumatic tire 1 is assembled on a rim. The ground contact width W (see FIG. 1) denotes the overall dimensions in the widthwise direction of the tire of the ground contact region AG of the tread surface (see FIG. 2) with an 80% applied load calculated based on the calculation formula listed in JIS D 4202-1994.

The center region AC (see FIG. 1) denotes a region having a width that is 50% the ground contact width with the tire equator line CL as its center. The center groove depth Gc (see FIG. 1) denotes the maximum groove depth of grooves provided in the center region AC, in other words, the depth of a groove among the grooves provided in the center region AC having maximum groove depth. The shoulder region AS (see FIG. 1) denotes each region outside in the widthwise direction of the tire from the center region AC, and each region having a width that is 25% the ground contact inside in the widthwise direction of the tire from each ground contact edge E, E. The shoulder groove depth Gs (see FIG. 1) denotes the maximum groove depth of grooves provided in the shoulder region AS, in other words, the depth of a groove among the grooves provided in the shoulder region AS having maximum groove depth. The tread groove depth Ga (not illustrated in FIG. 1) is the mean value of the center groove depth Gc and shoulder groove depth Gs.

Here, whether the above grooves are grooves provided in the center region AC or grooves provided in the shoulder region AS is determined as follows. FIGS. 3A to 3D are planar schematic views illustrating multiple examples of grooves provided on the tread surface of a pneumatic tire according to an embodiment of the present technology. Grooves G1 to G4 are each provided in different aspects in FIG. 3A to FIG. 3D.

Figure 3A:
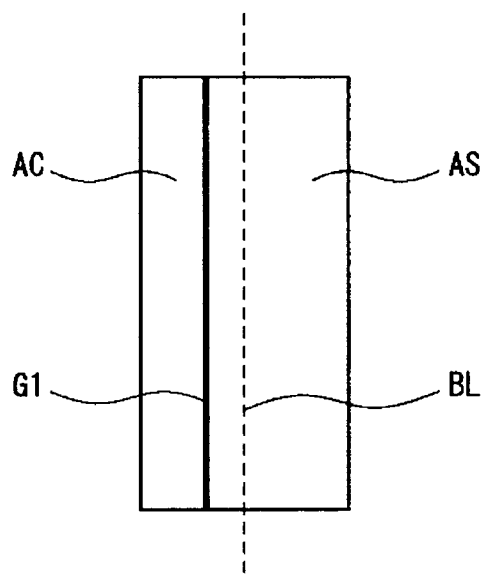
FIGS. 3A to 3D are planar schematic views illustrating multiple examples of grooves provided on the tread surface of a pneumatic tire according to an embodiment of the present technology.
Figure 3B:
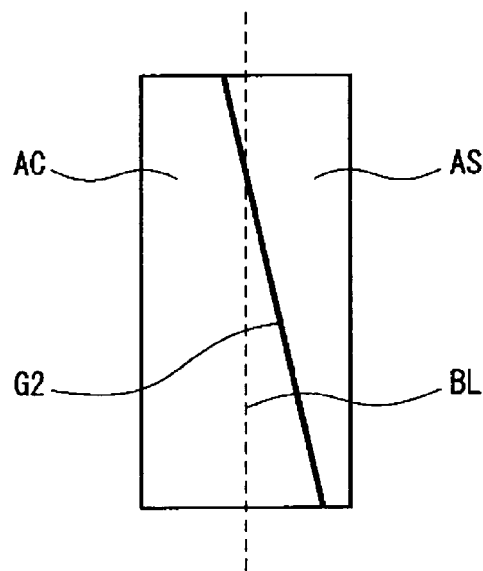
Figure 3C:
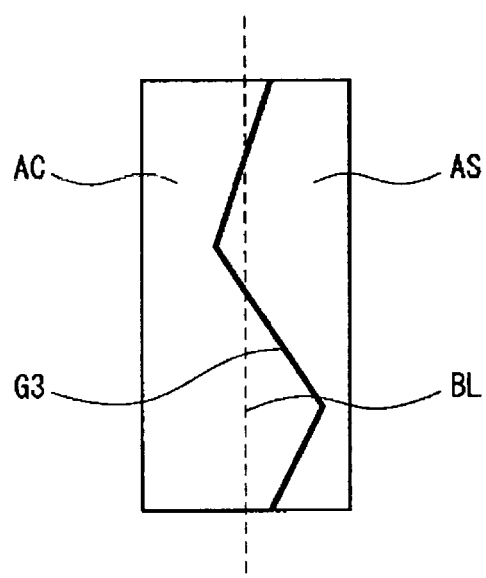
Figure 3D:
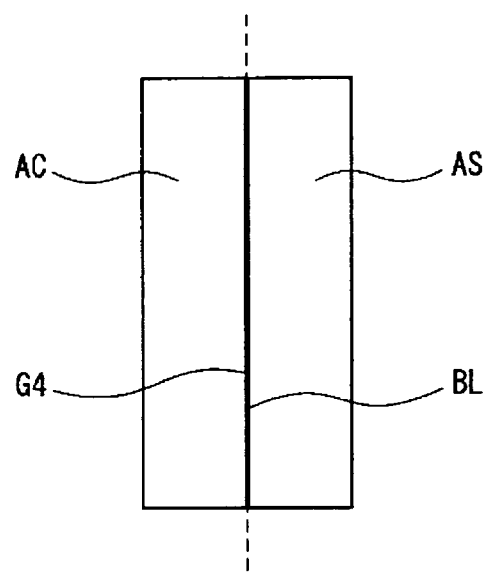

As illustrated in FIG. 3A, if groove G1 (circumferential groove) is extending only in either the center region AC or the shoulder region AS (this drawing also serves as an example of the groove G1 extending only in the center region AC), the groove is considered provided in the region through which it is extending (center region AC in this drawing). In addition, as illustrated in FIG. 3B and FIG. 3C, if grooves G2 and G3 (both diagonal grooves) are extending crossing the boundary line BL between the center region AC and shoulder region AS at least once, then grooves are considered provided in the region in which grooves G2 and G3 have the larger surface area (shoulder region AS in all cases in these drawings). Furthermore, as illustrated in FIG. 3D, if groove G4 (circumferential groove) extends on the boundary line BL, then groove G4 is a groove considered provided in center region AC for convenience.

Based on these definitions, in a pneumatic tire 1 according to the present embodiment:

total width SW and outside diameter OD satisfy the relationship $$SW/OD \leq 0.3 \quad \text{(Formula 1),}$$

tread groove depth Ga and total width SW satisfy the relationship $$Ga \leq 0.02 \times SW + 2.5 \quad \text{(Formula 2), and}$$

center groove depth Gc and shoulder groove depth Gs satisfy the relationship $$Gc > Gs \quad \text{(Formula 3).}$$

(Action and the Like)

In the present embodiment, as illustrated in Formula 1, the total width SW and outside diameter OD ratio SW/OD is 0.3 or less. That is, in the present embodiment, total width SW is largely narrowed relative to outside diameter OD. Thus, it is possible to reduce the frontal projected area of a tire, and as a result, limit the air resistance of the tire, and realize superior fuel efficiency.

However, normally, as illustrated above in Formula 1, if the total width SW is narrowed relative to the outside diameter OD, the dimensions of the ground contact surface in the widthwise direction of the tire become smaller, thus sufficient cornering power is not achieved, and superior steering stability performance cannot be realized. Therefore, in the present embodiment, as illustrated in Formula 2, the tread groove depth Ga is largely reduced in relation to the total width SW. Thus, since overall the grooves provided on the tread surface are shallower, it is possible to sufficiently ensure the rigidity of the land portions, and as a result, improve steering stability performance.

In addition, normally if the total width SW is narrowed relative to the outside diameter OD as illustrated in Formula 1, the ground contact length enlarges in the tire circumferential direction in the center region AC relative to the shoulder region AS, so the amount of wear in the center region AC increases relative to the amount of wear in the shoulder region AS. Hence, the center region AC reaches the wear limit before the shoulder region AS, a difference arises in wear life between the center region AC and shoulder region AS, and it is not possible to realize superior performance in terms of wear life throughout the tread surface. Here, wear limit refers to a state in which a tread surface has been worn so that the surface of a wear indicator formed projecting from a groove bottom is exposed on a tire tread surface.

Therefore, in the present embodiment, as illustrated in Formula 3, the center groove depth Gc is enlarged compared to the shoulder groove depth Gs. That is, in the present embodiment, when all of the grooves provided on the tread surface are shallowed according to Formula (2), the groove depth in the center region AC with a relatively high amount of wear relative to the depth of the shoulder region AS with a relatively low amount of wear is enlarged according to Formula (3). Thus, it is possible for the center region AC and shoulder region AS to reach the wear limit almost simultaneously, and as a result, it is possible to further lengthen the wear life of the tread surface overall, and improve performance in terms of wear life.

As illustrated above, according to a pneumatic tire of the present embodiment, it is possible to improve performance and balance in terms of fuel efficiency, steering stability performance and wear life, by properly adjusting the total width SW, outside diameter OD, tread groove depth Ga, center groove depth Gc and shoulder groove depth Gs.

Furthermore, as illustrated above, a pneumatic tire according to the present embodiment can be obtained via ordinary manufacturing steps; i.e., a tire material mixing step, a tire material machining step, a green tire molding step, a vulcanization step, a post-vulcanization inspection step, and the like. When manufacturing a pneumatic tire of the present technology, a green tire is molded and vulcanized, after finishing a tire via the post-vulcanization inspection step, such that it satisfies the relationships from Formula 1 to Formula 3 when prescribed air pressure is conferred while in a rim assembled state.

ADDITIONAL EMBODIMENTS

Next, descriptions are made of additional embodiments 1 to 4 which can be optionally implemented as opposed to basic embodiment of the pneumatic tire according to the present technology described above.

Additional Embodiment 1

In the basic embodiment, the outside diameter OD, inside diameter ID, the total width SW, the center groove depth Gc and the shoulder groove depth Gs preferably satisfy the relationship $$0.19 \times (OD-ID)/2SW + 1.0 \leq Gc/Gs \leq 0.19 \times (OD-ID)/2SW + 1.2 \quad \text{(Formula 4)}$$

(additional embodiment 1). Furthermore, the inside diameter ID indicates the converted value in mm of the nominal rim diameter of the pneumatic tire. Furthermore, in inequalities including the two inequality signs below, the subjects of all of the mathematical formulas interposing the inequality signs are denoted in order from the left as the left side, middle and right side.

First, hardly any difference is seen in the tire circumferential ground contact length of center region AC and the tire circumferential direction ground contact length of shoulder region AS in a tire (hereinafter, "low aspect tire") wherein the aspect ratio (equal to the mathematical formula [(OD−ID)/2SW] in Formula 4) is extremely low. Hence, in a low aspect tire, the wear in the center region AC and shoulder region AS advance to roughly the same degree, so it is thought that the center groove depth Gc and shoulder groove depth Gs are roughly equivalent.

Taking such findings into account, in the present embodiment, with a low aspect tire, that is, if the mathematical formula [(OD−ID)/2SW] approaches 0 in Formula 4, Formula 4 is stipulated so that the ratio Gc/Gs is a value relatively close to 1 (a range of approximately 1 to 1.2).

Furthermore, the ratio Gc/Gs being set to a range from roughly 1 to some larger value is due to wear advancing more quickly in the center region AC than the shoulder region AS, since the tire circumferential direction ground contact length is larger in the center region AC than the shoulder region AS, regardless of any aspect ratio.

Conversely, the tire circumferential ground contact length of the center region AC is large relative to the tire circumferential ground contact length of the shoulder region AS in a tire wherein the aspect ratio is extremely high (hereinafter, "high aspect tire"). Hence, in a high aspect tire, the wear in the center region AC advances very quickly relative to the wear in the shoulder region AS, so it is thought that the center groove depth Gc enlarges more than the shoulder groove depth Gs.

Taking such findings into account, in the present embodiment, with a high aspect tire, that is, if the mathematical formula [(OD−ID)/2SW] approaches 1 in Formula 4, Formula 4 is stipulated so that the ratio Gc/Gs is a value higher than 1 (a range of approximately 1.19 to 1.39).

Next, if the ratio Gc/Gs is too small for either a low aspect tire or high aspect tire, that is, if the center groove depth Gc is not large enough compared to the shoulder groove depth Gs, the center region AC will reach the wear limit before the shoulder region AS. Therefore, in the present embodiment, the relationship of left side≤middle in Formula 4 is stipulated so that the center region AC does not reach the wear limit before the shoulder region AS.

In addition, if the ratio Gc/Gs is too large for either a low aspect tire or high aspect tire, that is, if the center groove depth Gc is too large compared to the shoulder groove depth Gs, the shoulder region AS will reach the wear limit before the center region AC. Therefore, in the present embodiment, the relationship of middle≤right side in Formula 4 is stipulated so that the shoulder region AS does not reach the wear limit before the center region AC.

As illustrated above, in the present embodiment, it is possible for the center region AC and shoulder region AS to approach the wear limit almost simultaneously with various sizes of tires from low aspect tire to high aspect tire, and as a result, lengthen the wear life of the tread surface overall, and improve performance in terms of wear life.

Additional Embodiment 2

In the basic embodiment and an embodiment combining the additional embodiment 1 with the basic embodiment, the shoulder groove surface area ratio SR and shoulder groove depth Gs preferably satisfy the relationship $$-1.2 \times Gs + 23.0 \leq SR \leq -1.2 \times Gs + 38.0 \quad \text{(Formula 5)}$$

(additional embodiment 2).

Here, the shoulder groove surface area ratio SR denotes the rate of groove surface area, relative to the sum total of the land portion surface area and groove surface area within the ground contact region AG, in the shoulder region AS.

First, the rigidity of the land portion in the shoulder region of a tire wherein the shoulder groove depth Gs is relatively large (hereinafter, "Gs large tire") is relatively small, so it is not possible to realize superior steering stability performance. Hence, it is thought that in a Gs large tire, by further limiting the relationship of the shoulder groove depth Gs and other matters defining the technology (the shoulder groove surface area ratio SR described below), the steering stability performance is improved.

Taking such findings into account, in the present embodiment, with a Gs large tire, that is, if the shoulder groove depth Gs in Formula 5 is relatively large (approximately 8 mm for example), Formula 5 is stipulated so that the shoulder groove surface area ratio SR is a relatively low value (a range of approximately 13.4% to 28.4%). Thus, it is possible to sufficiently ensure the rigidity of the land portions in the shoulder region AS, and consequently improve steering stability performance.

Conversely, the capacity of the grooves in the shoulder region AS in a tire wherein the shoulder groove depth Gs is relatively small (hereinafter, Gs small tire) is relatively small, so it is not possible to realize superior drainage performance. Hence, it is thought that in a Gs small tire, by further limiting the relationship of the shoulder groove depth Gs and other matters defining the technology the shoulder groove surface area ratio SR), the drainage performance is improved.

Taking such findings into account, in the present embodiment, with a Gs small tire, that is, if the shoulder groove depth Gs in Formula 5 is relatively small (approximately 2.5 mm for example), Formula 5 is stipulated so that the shoulder groove surface area ratio SR is a relatively high value (a range of approximately 20% to 35%). Thus, it is possible to sufficiently ensure the capacity of the shoulder region AS, and improve drainage performance.

Next, if the shoulder groove surface area ratio SR in either a large tire or Gs small tire is too small, that is, if the capacity of the grooves in the shoulder region AS is too small, it is not possible to realize superior drainage performance. Therefore, in the present embodiment, the relationship left side≤middle in Formula 5 is stipulated so that the capacity of the grooves in the shoulder region AS is sufficiently ensured, so that superior drainage performance is realized.

In addition, if the shoulder groove surface area ratio SR in either a Gs large tire or Gs small tire is too large, that is, if the rigidity of the land portions in the shoulder region AS is too small, it is not possible to realize superior steering stability performance. Therefore, in the present embodiment, the relationship middle≤right side in Formula 5 is stipulated so that the rigidity of the land portions in the shoulder region AS is sufficiently ensured, so that superior steering stability performance is realized.

As illustrated above, in the present embodiment, it is possible to sufficiently ensure the capacity of the grooves in the shoulder region AS, and sufficiently ensure the rigidity of the land portions in the shoulder region AS, with various tires from ones with large shoulder groove depth Gs to ones with small. As a result, improved and well-balanced drainage performance and steering stability performance are possible.

Additional Embodiment 3

In the basic embodiment and an embodiment combining at least additional embodiments 1 and 2 with the basic embodiment, the center groove surface area ratio CR and center groove depth Gc preferably satisfy the relationship $$1.4 \times Gc + 11.4 \leq CR \leq 1.4 \times Gc + 26.4 \quad \text{(Formula 6)}$$

(additional embodiment 3).

Here, the center groove surface area ratio CR denotes the rate of groove surface area, relative to the sum total of the land portion surface area and groove surface area within the ground contact region AG, in the center region AC.

First, the center region AC in a tire wherein the center groove depth Gc is relatively small (hereinafter Gc small tire) reaches the wear limit relatively quickly, so it is not possible to realize superior performance in terms of wear life. Hence, it is thought that in a Gc small tire, by further limiting the relationship of the center groove depth Gs and other matters defining the technology (the center groove surface area ratio CR), the performance in terms of wear life is improved.

Taking such findings into account, in the present embodiment, with a Gc small tire, that is, if the center groove depth Gc in Formula 6 is relatively small (approximately 2.5 mm for example), Formula 6 is stipulated so that the center groove surface area ratio CR is a relatively low value (a range of approximately 14.9% to 29.9%). Thus, in the center region AC, it is possible to increase the rigidity of the land portions, sufficiently ensure a wearable region (ground contact surface), and furthermore, limit ground contact surface pressure. As a result, it is possible for the center region AC to reach the wear limit relatively slowly, and consequently, improve performance in terms of wear life.

Conversely, the center region AC in a tire wherein the center groove depth Gc is relatively large (hereinafter Gc large tire) reaches the wear limit relatively slowly, so it is possible to realize superior performance in terms of wear life. Therefore, it is thought by enlarging the center groove surface area ratio CR in order to further improve drainage performance, performance in terms of wear life is fully secured, even if there is some drop in the rigidity of the land portions, decrease in the wearable region (ground contact surface) and rise in ground contact surface pressure.

Taking such findings into account, in the present embodiment, with a Gc large tire, that is, if the center groove depth Gc in Formula 6 is relatively large (approximately 8 mm for example), Formula 6 is stipulated so that the center groove surface area ratio CR is a relatively high value (a range of approximately 22.6% to 37.6%). Thus, it is possible to enlarge the capacity of the grooves in the center region AC, and consequently improve drainage performance.

Next, if the center groove surface ratio CR is too small in either Gc small tire or Gc large tire, that is, if the capacity of the grooves in the center region AC is too small, it is not possible to realize superior drainage performance. Therefore, in the present embodiment, the relationship left side≤middle in Formula 6 is stipulated so that the capacity of the grooves in the center region AC is sufficiently ensured, so that superior drainage performance is realized.

In addition, if the center groove surface area ratio CR in either a Gc small tire or Gc large tire is too large, not only will the rigidity of the land portions in the center region AC be excessively small, the wearable region (ground contact surface) will be excessively small, and moreover, the ground contact surface pressure will be excessively high. Hence, the center region AC reaches the wear limit relatively quickly, and consequently, it is not possible to realize superior performance in terms of wear life. Therefore, in the present embodiment, the rigidity of the land portions in the center region AC is sufficiently ensured, and the wearable region (ground contact surface) is sufficiently ensured, so performance in terms of wear life is improved, and furthermore, the relationship middle≤right side in Formula 6 is stipulated so that the ground contact surface pressure is not excessively high.

As illustrated above, in the present embodiment, it is possible to sufficiently ensure the capacity of the grooves in the center region AC, and sufficiently ensure the rigidity of the land portions in the center region AC, with various tires from ones with small center groove depth Gc to ones with large, and as a result, improved, well-balanced performance in terms of drainage performance and wear life is possible.

Additional Embodiment 4

In the basic embodiment and an embodiment combining the basic embodiment and at least one of the additional embodiments 1 to 3, grooves having center groove depth Gc are preferably circumferential grooves (additional embodiment 4).

Grooves having center groove depth Gc are relatively large in capacity in the center region AC, and so among grooves having the same direction of extension, these are particularly high in drainage performance. In addition, the tire circumferential direction ground contact length is larger in the center region AC than the shoulder region AS, so the fact that circumferential grooves are provided in the center region AC more than the shoulder region AS ensures a larger extension length in the ground contact region AG, and makes it possible to realize more superior drainage performance.

Taking such findings into account, in the present embodiment, grooves with relatively large capacity, high drainage performance and center groove depth Gc are circumferential grooves that demonstrate favorable drainage performance in the center region AC compared to the shoulder region AS. Thus, by efficiently using grooves having center groove depth Gc, it is possible to improve drainage performance.

EXAMPLES

The pneumatic tires in embodiments 1 to 8 and the conventional example were prepared having the tire meridian cross section in FIG. 1, and according to the conditions listed in Table 1 (groove types having total width SW, outside diameter OD, tread groove depth Ga, center groove depth Gc, shoulder groove depth Gs, shoulder groove surface area ratio SR, center groove surface area ratio CR and center groove depth Gc, and groove types having shoulder groove depth Gs).

Performance in terms of fuel efficiency, steering stability performance and wear life, and drainage performance, was evaluated for each test tire thus prepared in the first embodiment to the eighth embodiment, and in the conventional example. Results of these tests are shown in Table 1.
(Fuel Efficiency)

Each test tire was assembled with rim, installed in a small front-wheel drive vehicle with 1800 cc displacement, driven for 50 laps on a 2 km/lap test course at speeds of 100 km/h, and the inverse of the fuel consumption rate was calculated. Then, the index of each embodiment was calculated as the fuel economy index against the inverse of the fuel consumption rate of the conventional example for reference (100). In this evaluation, higher numerical values indicate higher fuel efficiency.
(Steering Stability)

Each test tire was assembled on a rim, installed in a small front-wheel drive vehicle with 1800 cc displacement, driven for three laps while changing lanes on a 2 km/lap test course at speeds of 100 km/h. A functional evaluation was performed by three drivers, and the mean value of the evaluation values calculated. Then, based on the calculation results, index evaluation was performed using the conventional example for reference (100). Higher index values indicated better steering stability.
(Performance in Terms of Wear Life)

Each test tire was assembled on a rim, installed in a small front-wheel drive vehicle with 1800 cc displacement, and driven for 10 thousand km. The amount of remaining grooves with center groove depth Gc, and the amount of remaining grooves with shoulder groove depth Gs, were calculated. Then, based on the calculation results, index evaluation was performed using the conventional example for reference (100). Higher index values indicate better performance in terms of wear life.

(Drainage Performance)

Each test tire was assembled on a rim, installed in a small front-wheel drive vehicle with 1800 cc displacement, driven through a pool of water 10 mm deep at a prescribed speed, and the slip rate of the pneumatic tires was measured. Measurements were repeated gradually raising the prescribed speed, and the speed when the slip rate reached 10% was considered hydroplaning speed. Then, based on the calculation results, index evaluation was performed using the conventional example for reference (100). Higher index values indicated better drainage performance.

TABLE 1

|  | Conventional Example | Working Example 1 | Working Example 2 | Working Example 3 | Working Example 4 |
|---|---|---|---|---|---|
| Total width SW (mm) | 170 | 170 | 170 | 170 | 170 |
| Outside diameter OD (mm) | 695 | 695 | 695 | 695 | 695 |
| SW/OD | 0.24 | 0.24 | 0.24 | 0.24 | 0.24 |
| Tread groove depth Ga (mm) | 6.2 | 5.8 | 5.8 | 5.8 | 5.8 |
| Center groove depth Gc (mm) | 6.2 | 6.6 | 6.3 | 6.6 | 6.6 |
| Shoulder groove depth Gs (mm) | 6.2 | 5 | 5.3 | 5 | 5 |
| Inside diameter ID (mm) | 508 | 508 | 508 | 508 | 508 |
| Shoulder groove surface area ratio SR (%) | 32 | 34 | 34 | 28 | 34 |
| Center groove surface area ratio CR (%) | 37 | 37 | 37 | 37 | 32 |
| Satisfies Formula 1? | ○ | ○ | ○ | ○ | ○ |
| Satisfies Formula 2? | x | ○ | ○ | ○ | ○ |
| Satisfies Formula 3? | x | ○ | ○ | ○ | ○ |
| Satisfies Formula 4? | x | x | ○ | x | x |
| Satisfies Formula 5? | ○ | x | x | ○ | x |
| Satisfies Formula 6? | ○ | x | x | x | ○ |
| Groove having center groove depth Gc is a circumferential groove? | ○ | x | x | x | x |
| Fuel efficiency | 100 | 100.5 | 100.5 | 100.5 | 100.5 |
| Steering stability performance | 100 | 103 | 103 | 104 | 103 |
| Performance in terms of wear life | 100 | 100 | 102 | 100 | 101 |
| Drainage performance: | 100 | 100 | 100 | 98 | 98 |

|  | Conventional Example | Working Example 5 | Working Example 6 | Working Example 7 | Working Example 8 |
|---|---|---|---|---|---|
| Total width SW (mm) | 170 | 170 | 170 | 170 | 170 |
| Outside diameter OD (mm) | 695 | 695 | 695 | 695 | 695 |
| SW/OD | 0.24 | 0.24 | 0.24 | 0.24 | 0.24 |
| Tread groove depth Ga (mm) | 6.2 | 5.8 | 5.8 | 5.8 | 5.8 |
| Center groove depth Gc (mm) | 6.2 | 6.6 | 6.3 | 6.3 | 6.3 |
| Shoulder groove depth Gs (mm) | 6.2 | 5 | 5.3 | 5.3 | 5.3 |
| Inside diameter ID (mm) | 508 | 508 | 508 | 508 | 508 |
| Shoulder groove surface area ratio SR (%) | 32 | 34 | 28 | 28 | 28 |
| Center groove surface area ratio CR (%) | 37 | 37 | 37 | 32 | 32 |
| Satisfies Formula 1? | x | ○ | ○ | ○ | ○ |
| Satisfies Formula 2? | x | ○ | ○ | ○ | ○ |
| Satisfies Formula 3? | x | ○ | ○ | ○ | ○ |
| Satisfies Formula 4? | x | x | ○ | ○ | ○ |
| Satisfies Formula 5? | ○ | x | ○ | ○ | ○ |
| Satisfies Formula 6? | ○ | x | x | ○ | ○ |
| Groove having center groove depth Gc is a circumferential groove? | ○ | ○ | x | x | ○ |
| Fuel efficiency | 100 | 100.5 | 100.5 | 100.5 | 100.5 |
| Steering stability performance | 100 | 103 | 104 | 104 | 104 |
| Performance in terms of wear life | 100 | 100 | 102 | 103 | 103 |
| Drainage performance: | 100 | 101 | 98 | 96 | 97 |

Furthermore, in Table 1, an ○ mark means that prescribed conditions are satisfied, and an x mark means that prescribed conditions are not satisfied.

According to Table 1, it was found that all of the pneumatic tires in embodiments 1 to 8, which satisfied the technical scope of the present technology (Formula 1, Formula 2, Formula 3), were improved and well-balanced at least in fuel efficiency, steering stability performance and wear life, more so than the pneumatic tire in the conventional example, which did not fall within the technical scope of the present technology.

What is claimed is:

1. A pneumatic tire comprising grooves provided on a tread portion:

total width SW and outside diameter OD satisfy a relationship $SW/OD \leq 0.3$; and maximum groove depth of a groove provided in a center region AC having a width 50% of ground contact width W with a tire equator line as its center being center groove depth Gc; maximum groove depth of a groove provided in a shoulder region AS outside from the center region AC in the direction of tire width being shoulder groove depth Gs; and a mean value of the center groove depth Gc and the shoulder groove depth Gs denoting tread groove depth Ga;

the tread groove depth Ga and the total width SW, represented in millimeter units, satisfying a relationship $Ga \leq 0.02 \times SW + 2.5$ mm;

the center groove depth Gc and the shoulder groove depth Gs satisfying a relationship $Gc > Gs$; and the outside diameter OD, inside diameter ID, the total width SW, the center groove depth Gc and the shoulder groove depth Gs satisfying a relationship $0.19 \times (OD-ID)/2SW + 1.0 \leq Gc/Gs < 0.19 \times (OD-ID)/2SW + 1.2$;

wherein the groove having the center groove depth Gc is a circumferential main groove, wherein the groove having the shoulder groove depth Gs is a circumferential thin groove which has a groove width less than that of the circumferential main groove, and wherein a plurality of lateral grooves are formed in the shoulder region AS and all lateral grooves formed in the shoulder region AS terminate in the shoulder region AS without communicating with the circumferential thin groove.

2. The pneumatic tire, according to claim 1, wherein a shoulder groove surface area ratio SR and the shoulder groove depth Gs satisfy a relationship $-1.2 \times Gs + 23.0 \leq SR \leq -1.2 \times Gs + 38.0$.

3. The pneumatic tire according to claim 1, wherein a center groove surface area ratio CR and the center groove depth Gc satisfy a relationship $1.4 \times Gc + 11.4 \leq CR \leq 1.4 \times Gc + 26.4$.

4. The pneumatic tire according to claim 2, wherein a center groove surface area ratio CR and the center groove depth Gc satisfy a relationship $1.4 \times Gc + 11.4 \leq CR \leq 1.4 \times Gc + 26.4$.

5. The pneumatic tire according to claim 1, wherein $14.9\% \leq CR \leq 21\%$.

* * * * *